United States Patent [19]
Avetisian et al.

[11] Patent Number: 5,464,503
[45] Date of Patent: Nov. 7, 1995

[54] TIRE LIQUEFYING PROCESS REACTOR DISCHARGE SYSTEM AND METHOD

[75] Inventors: Vahan Avetisian, Burbank; Craig J. Castagnoli, Rowland Heights; Suk B. Cha, Long Beach, all of Calif.

[73] Assignee: Texaco Inc., White Plains, N.Y.

[21] Appl. No.: 142,014

[22] Filed: Oct. 28, 1993

[51] Int. Cl.[6] .......................... C10B 47/18; C10B 53/00
[52] U.S. Cl. .................................. 201/3; 201/25; 201/32; 202/118; 202/226; 585/241
[58] Field of Search .............................. 585/241; 201/2.5, 201/3, 4, 25, 32; 202/118, 226

[56] References Cited

U.S. PATENT DOCUMENTS

| | | | |
|---|---|---|---|
| 1,534,737 | 4/1925 | Reed | 202/118 |
| 4,062,304 | 12/1977 | Herbold et al. | 202/118 |
| 4,074,979 | 2/1978 | Kurisu et al. | 201/25 |
| 4,686,007 | 8/1987 | Lyakhevich et al. | 201/3 |
| 5,070,109 | 12/1991 | Ulick et al. | 585/241 |

FOREIGN PATENT DOCUMENTS 2922553  12/1979  Germany ............................. 585/241

*Primary Examiner*—Joye L. Woodard

[57] ABSTRACT

A discharge system is used with a tire liquefaction process using a reactor. The system includes a receiver receiving unreacted components, including oil coated metal, from the reactor. The unreacted components are moved through a pyrolysis reactor where they are heated to a temperature sufficient to convert the unreacted hydrocarbon components to a liquid and to gas by way of pyrolysis. The liquid and the majority of gas are drawn off from the pyrolysis reactor. Discharge apparatus connected to the pyrolysis reactor converts the remaining gas to a condensate and discharges the metal. The condensate is also removed for further use.

7 Claims, 1 Drawing Sheet

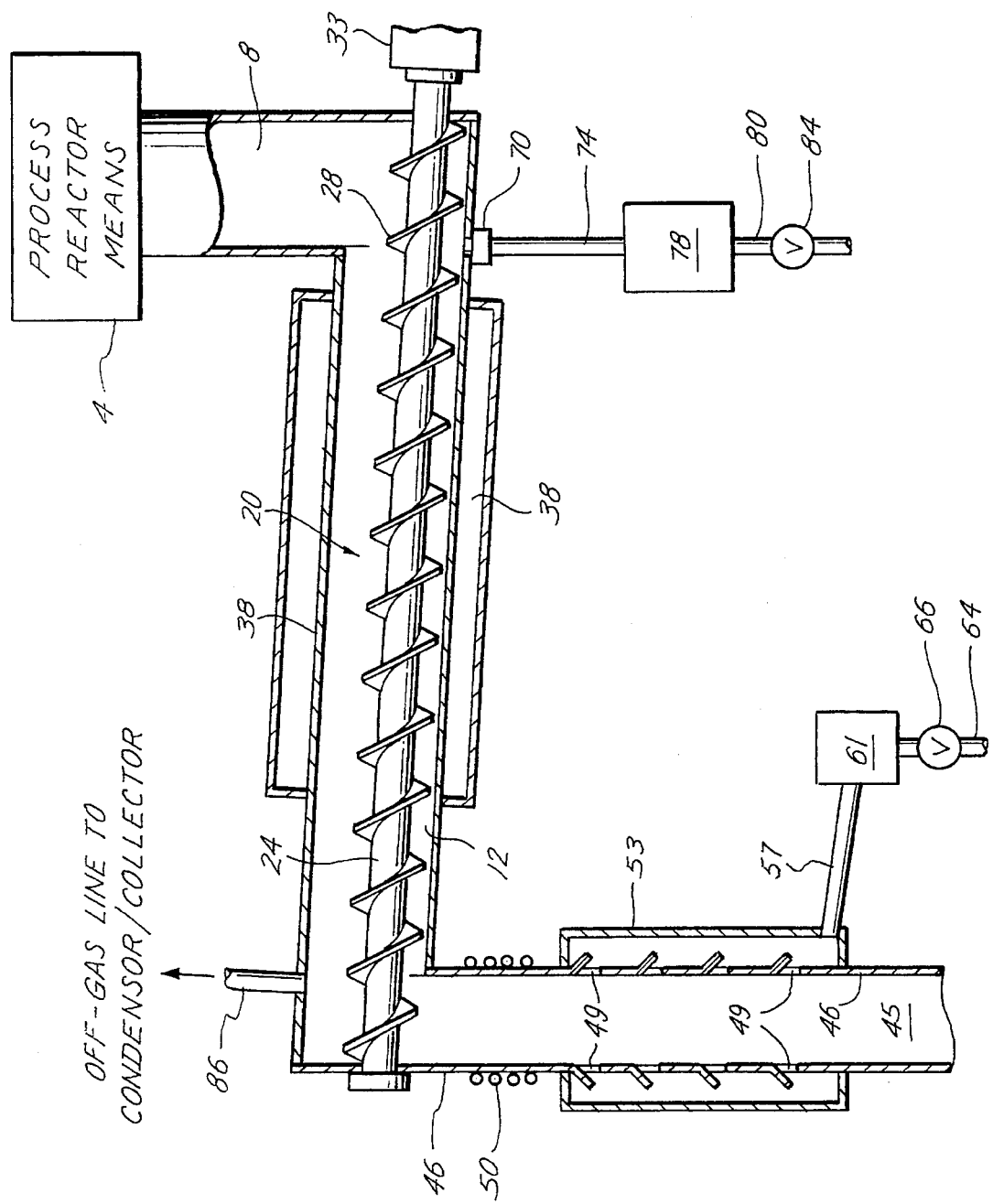

TIRE LIQUEFYING PROCESS REACTOR DISCHARGE SYSTEM AND METHOD

BACKGROUND OF THE INVENTION

FIELD OF THE INVENTION

The present invention relates to means and methods for discharging unreacted components from a reaction process and, more particularly, to discharge unreacted components from a tire liquefying process.

SUMMARY OF THE INVENTION

A discharge system is used with a tire liquefying process using a reactor. The system includes a receiver receiving unreacted components, including oil coated metal, from the reactor. The unreacted components are moved through a pyrolysis reactor where they are heated to a temperature sufficient to convert the unreacted hydrocarbon components to a liquid and to gas by way of pyrolysis. The liquid and the majority of gas are drawn off from the pyrolysis reactor. Discharge apparatus connected to the pyrolysis reactor converts the remaining gas to a condensate and discharges the metal. The condensate is also removed for further use.

The object and advantages of the invention will appear more fully hereinafter from a consideration of the detailed description which follows, taken together with the accompanying drawing, wherein one embodiment of the invention is illustrated by way of example. It is to be expressly understood, however, that the drawing is for illustration purposes only and is not to be construed as defining the limits of the invention.

DESCRIPTION OF THE DRAWING.

The FIGURE is a graphical representation of a discharge system constructed in accordance with the present invention.

DESCRIPTION OF THE INVENTION

Referring to the drawing, process reactor means 4, which may be of the type described and disclosed in a U.S. Patent application Ser. No. 08/053,727, filed Apr. 27, 1993, is used to react tires and liquid oil, generally in the form of waste oil, to convert most hydrocarbon components of the tires to tire oil. However, in the process, there are unreacted components. Many of the shredded tires, if not all of the shredded tires, will have pieces of metal in them, either from the steel belt, in the steel belted radial-type tires, or from the beading around the edge of the tires. Further, there will also be other unreacted hydrocarbon components. The unreacted components are discharged from process reactor means 4 through a discharge system of the present invention which includes a downward chute-type element 8 connected to a predominantly horizontally arranged conduit element 12. Although the terminology predominantly horizontal has been used, its only used to describe conduit element 12 in spatial relationship to element 8 and other chute-type elements to follow. It is in fact, at a slight angle upward commencing from chute 8, sufficient to let a liquid flow down conduit element 12.

A screw auger 20 having a shaft 24 and a spiral-type blade 28 is continually rotated by drive means 33. Surrounding a portion of conduit element 12 is a pyrolysis reactor 38. Pyrolysis reactor 38 is actually a plurality of electrical surface heaters manufactured by Watlow Inc. mounted on the outer surface of conduit element 12. The output of member 12 wrapped around a non-vented portion of chute 45 and carry a cooling liquid such as water as hereinafter explained. Chute 45 is vented with flared vents 49 at various locations and surrounding the venting portion of chute 45 is an enclosure of a chamber 53. Chamber 53 has a pipe 57 connected to tank means 61. Tank means 61 has a discharge pipe 64 including a valve 66.

Similarly, as noted earlier, the conduit element 12 is at one angle of inclination; the bottom of chute 8 is at different angle of inclination so that any fluid as hereinafter explained is directed towards a means for drawing off liquid which includes an opening having a screen 70 covering the inlet to a pipe 74 which is connected to another tank means 78 whose outlet pipe 80 includes a valve 84.

Further conduit element 12 has an outlet pipe 86 which causes the majority of the gas to be removed from conduit element 12 and provided to a condensor/collector not shown.

In operation as the unreacted components of the shredded tires fall from process reactor means 4 through chute 8, where they are moved by screw auger 20 through conduit element 12 in a slightly upward direction towards chute 45. In this process, the oil/metal mixture is heated by pyrolysis reactor 38 to a temperature in a temperature range of 900° F. to 1500° F. The unreacted hydrocarbon components are pyrolyzed into a liquid and gas. The liquid drains down conduit element 12 towards drain 70 and passes through pipe 74 into tank means 78. As noted, the majority of the gas leaves a means for drawing off most of the gas produced in the pyrolysis reactor, such as pipe 86, however, the remaining gas and the metal components keep moving upward towards chute 45. Gas accumulates in chute 45 with some of it coming in contact with cool walls of chute 45.

Coils 50 are provided with a cooling liquid, which may be water or any other type of liquid desired, causing a cool area on the surface of chute 45 thereby causing condensing of the gas entering chute 45 to form condensate on cooled walls 46 in that area. The condensate flows down walls 46 and drains off at the various vents 49. As the condensate flows on the surface of vents 49, the flare-up causes the condensate to drip. A thermal syphon effect exists in the cooling position of chute 45 thereby facilitating the condensation of the gas on walls 46. The liquid in chamber 53 passes through line 57 and into tank means 61 to accumulate.

Meanwhile, the metal components in chute 45 emerge from chute 45 cleaned, dried and ready for recycling.

What is claimed is:

1. A discharge method associated with a tire liquefying process using a process reactor, comprising the steps of:

receiving unreacted hydrocarbons and metal components of tires from a tire liquefying process reactor;

moving the unreacted components with an auger screw means;

heating the moving unreacted components to a temperature sufficient to convert the unreacted hydrocarbon components to a liquid and a gas by pyrolysis;

drawing off the liquid;

drawing off most of the gas;

cooling the remaining gas after pyrolysis that is not drawn off to a condensate in a vertical conduit;

drawing off the condensate from the vertical conduit; and discharging unreacted metal components through the vertical conduit that is used to cool and condense the remaining gas.

2. A method as described in claim 1 in which the cooling step includes using a cooling coils of tubing containing a cooling liquid, said tubing wrapped around a portion of the vertical conduit so as to create a cool surface on that portion of the vertical conduit for the gas to condense on.

3. A method as described in claim 1 in which the condensate drawing off step includes:

venting the vertical conduit with flared openings in its side located below the cooling portion; and accumulating the condensate that has passed through the vented openings.

4. A method as described in claim 3 further comprising the step of removing the liquid resulting from the pyrolysis of the unreacted components.

5. A discharge system for a tire liquefying process reacting tires and oil using a process reactor, comprising:

a first vertical conduit for receiving unreacted hydrocarbons and metal components of the tires from a tire liquefying process reactor;

a pyrolysis reactor having an auger screw means for moving the unreacted components therethrough and a heating means for heating the unreacted components to a temperature sufficient to convert the unreacted hydrocarbon components to a liquid and to a gas by way of pyrolysis;

said first vertical conduit allowing the unreacted hydrocarbons and metal components to pass through to the pyrolysis reactor;

said pyrolysis reactor set at a slight angle to the horizon sufficient to allow fluid to flow due to gravity and connected to said first vertical conduit;

a second vertical conduit connected to the pyrolysis reactor at the opposite end of the pyrolysis reactor from the first vertical conduit for receiving components from the pyrolysis reactor and discharging metal components from the system;

a means for drawing off liquid from the pyrolysis reactor located at the end of the pyrolysis reactor near the first vertical conduit;

a means for drawing off most of the gas produced in the pyrolysis reactor located at the end of the pyrolysis reactor near the second vertical conduit;

cooling coils wrapped around a portion of the second vertical conduit so as to create a cool surface on that portion of the second vertical conduit for gas from the pyrolysis reactor which has entered the second vertical conduit to condense on to form a condensate; and a flared vent means for removing condensate from the second vertical conduit located in a portion of the second vertical conduit below the cooling jacket.

6. A system as described in claim 5 in which the flared vent means further includes:

enclosure means surrounding that portion of the second vertical conduit that is vented by the flared vent means for gathering the condensate that has passed through the flared vent means; and tank means connected to the enclosure means for accumulating the condensate that has passed through the flared vent means.

7. A system as described in claim 5 in which the heating means is located on the outside of the pyrolysis reactor for creating heat so as to pyrolyze the unreacted hydrocarbon components passing through the pyrolysis reactor.

* * * * *